(12) United States Patent
Suzuki et al.

(10) Patent No.: US 11,117,473 B2
(45) Date of Patent: Sep. 14, 2021

(54) BICYCLE POWER SUPPLYING DEVICE AND BICYCLE ELECTRIC DEVICE INCLUDING BICYCLE POWER SUPPLYING DEVICE

(71) Applicant: Shimano Inc., Osaka (JP)

(72) Inventors: Takafumi Suzuki, Osaka (JP); Yoshinori Iino, Osaka (JP)

(73) Assignee: Shimano Inc., Osaka (JP)

( * ) Notice: Subject to any disclaimer, the term of this patent is extended or adjusted under 35 U.S.C. 154(b) by 140 days.

(21) Appl. No.: 15/695,461

(22) Filed: Sep. 5, 2017

(65) Prior Publication Data

US 2018/0093585 A1 Apr. 5, 2018

(30) Foreign Application Priority Data

Oct. 5, 2016 (JP) .............................. JP2016-197550

(51) Int. Cl.
*B62K 19/30* (2006.01)
*B62K 11/14* (2006.01)
(Continued)

(52) U.S. Cl.
CPC ........... *B60L 11/1887* (2013.01); *B60L 1/003* (2013.01); *B60L 50/20* (2019.02); *B60L 58/10* (2019.02); *B60L 58/40* (2019.02); *B60R 16/033* (2013.01); *B62K 11/14* (2013.01); *B62K 19/30* (2013.01); *B62M 6/45* (2013.01); *B62M 6/90* (2013.01); *B60L 2200/12* (2013.01); *B62J 43/00* (2020.02); *B62K 25/00* (2013.01); *B62M 9/121* (2013.01); *B62M 9/131* (2013.01); *Y02T 10/70* (2013.01); *Y02T 90/40* (2013.01)

(58) Field of Classification Search
CPC ....................... B62K 2208/00; B62K 2204/00; B62K 11/14; B62K 19/30; B62M 6/45; B62M 6/90; B60L 2200/12; B60L 1/003; B60R 16/033; B60R 16/04; B62J 43/00; B62J 43/28; B62J 43/30
USPC ....................... 180/6.24, 207.1, 207.2, 207.3
See application file for complete search history.

(56) References Cited

U.S. PATENT DOCUMENTS

| 6,788,025 B2* | 9/2004 | Bertness | H02J 7/0054 320/104 |
| 2005/0029766 A1* | 2/2005 | Ierfone | A63C 17/26 280/87.042 |

(Continued)

FOREIGN PATENT DOCUMENTS

| CN | 2217553 Y | 1/1996 |
| CN | 105128996 A | 12/2015 |

(Continued)

*Primary Examiner* — Anne M Boehler
(74) *Attorney, Agent, or Firm* — Global IP Counselors, LLP

(57) ABSTRACT

A bicycle power supplying device is configured to easily obtain the power needed to drive a subject electric component and a bicycle electric device that includes the bicycle power supplying device. The bicycle power supplying device includes a holder and a power storage unit. The holder holds a dry cell so that the dry cell is attachable to and removable from the holder. The dry cell includes a body, a first electrode arranged on the body, and a second electrode arranged on the body. The power storage unit is configured to store power of the dry cell and supply the stored power to a subject electric component.

20 Claims, 6 Drawing Sheets

(51) Int. Cl.
  *B60L 1/00* (2006.01)
  *B60R 16/033* (2006.01)
  *B60R 16/04* (2006.01)
  *B62J 43/00* (2020.01)
  *B62J 43/28* (2020.01)
  *B62J 43/30* (2020.01)
  *B60L 11/18* (2006.01)
  *B60L 58/40* (2019.01)
  *B60L 50/20* (2019.01)
  *B60L 58/10* (2019.01)
  *B62M 6/45* (2010.01)
  *B62M 6/90* (2010.01)
  *B62M 9/131* (2010.01)
  *B62M 9/121* (2010.01)
  *B62K 25/00* (2006.01)

(56) References Cited

U.S. PATENT DOCUMENTS

| | | | |
|---|---|---|---|
| 2006/0183584 A1 | 8/2006 | Fukuda | |
| 2009/0147505 A1* | 6/2009 | Robinett | H02J 7/35 362/183 |
| 2011/0308871 A1* | 12/2011 | Hecken | B62M 6/90 180/206.1 |
| 2012/0053804 A1 | 3/2012 | Saida et al. | |
| 2012/0313407 A1* | 12/2012 | Calfee | B62J 1/08 297/195.1 |
| 2013/0202938 A1* | 8/2013 | Fujii | B62J 1/08 429/100 |
| 2014/0081495 A1* | 3/2014 | Son | B60L 15/2045 701/22 |
| 2015/0352973 A1 | 12/2015 | Gao | |
| 2016/0031523 A1* | 2/2016 | Tetsuka | B62M 3/16 74/594.2 |
| 2016/0096493 A1* | 4/2016 | Suzuki | B62M 6/45 320/162 |
| 2016/0257269 A1 | 9/2016 | Watarai et al. | |
| 2017/0310125 A1* | 10/2017 | Estrada | H02M 3/338 |
| 2018/0269002 A1* | 9/2018 | Yamazaki | H01G 4/33 |

FOREIGN PATENT DOCUMENTS

| | | |
|---|---|---|
| JP | 8-108875 A | 4/1996 |
| JP | 10-291490 A | 11/1998 |
| JP | 10-291492 A | 11/1998 |
| JP | 2005-75194 A | 3/2005 |
| JP | 2006-219029 A | 8/2006 |
| JP | 2012-50304 A | 3/2012 |
| JP | 2016-165991 A | 9/2016 |

* cited by examiner

BICYCLE POWER SUPPLYING DEVICE AND BICYCLE ELECTRIC DEVICE INCLUDING BICYCLE POWER SUPPLYING DEVICE

CROSS-REFERENCE TO RELATED APPLICATIONS

This application claims priority to Japanese Patent Application No. 2016-197550, filed on Oct. 5, 2016. The entire disclosure of Japanese Patent Application No. 2016-197550 is hereby incorporated herein by reference.

BACKGROUND

Field of the Invention

The present invention generally relates to a bicycle power supplying device that is configured to supply power to a subject electric component and a bicycle electric device that includes the bicycle power supplying device.

Background Information

A known bicycle power supplying device includes a battery configured to supply power to a subject electric component. The electric component is driven by the power supplied from the battery. Japanese Laid-Open Patent Publication No. 2015-231764 (Patent Document 1) discloses one example of a prior art bicycle power supplying device.

SUMMARY

It is desirable that a bicycle power supplying device easily obtain the power needed to drive a subject electric component.

It is an object of the present invention to provide a bicycle power supplying device configured to easily obtain the power needed to drive a subject electric component and a bicycle electric device that includes the bicycle power supplying device.

In accordance with a first aspect of the present invention, a bicycle power supplying device includes a holder and a power storage unit. The holder is configured to attachably and detachably hold a dry cell that includes a body, a first electrode arranged on the body, and a second electrode arranged on the body. The power storage unit is configured to store power of the dry cell and supply the stored power to a subject elect component. Since the bicycle power supplying device according to the first aspect includes the holder and the power storage unit, the power needed to drive the subject electric component is easily obtained.

In accordance with a second aspect of the present invention, the bicycle power supplying device according to the first aspect further includes a booster configured to increase voltage of the dry cell. Thus, the power needed to drive the subject electric component is further easily obtained.

In accordance with a third aspect of the present invention, the bicycle power supplying device according to the second aspect is configured so that the booster is arranged between the holder and the power storage unit to be electrically connected to the holder and the power storage unit. This facilitates miniaturization of the bicycle power supplying device.

In accordance with a fourth aspect of the present invention, the bicycle power supplying device according to any one of the first to third aspects is configured so that the body is tubular. This allows the body to be accommodated in a tubular portion such as a handlebar of a bicycle.

In accordance with a fifth aspect of the present invention, the bicycle power supplying device according to any one of the first to fourth aspects is configured to the first electrode is arranged on one end of the body, and the second electrode is arranged on the other end of the body. This allows the user to easily recognize the first electrode and the second electrode.

In accordance with a sixth aspect of the present invention, the bicycle power supplying device according to any one of the first to fifth aspects further includes an electronic controller that controls the electric component. Thus, the power needed to drive the controller is easily obtained.

In accordance with a seventh aspect of the present invention, the bicycle power supplying device according to any one of the first to sixth aspects is configured so that the holder is attachable to an attachment portion of a bicycle that includes the electric component. This allows the bicycle power supplying device to be easily attached to the attachment portion of the bicycle.

In accordance with an eighth aspect of the present invention, the bicycle power supplying device according to the seventh aspect is configured so that the attachment portion is arranged in a handlebar of the bicycle, and the holder and the power storage unit are configured to be accommodated in the handlebar. Thus, the holder and the power storage unit are protected by the handlebar of the bicycle.

In accordance with a ninth aspect of the present invention, the bicycle power supplying device according to the seventh aspect is configured so that the attachment portion is arranged in a frame of the bicycle, and the holder and the power storage unit are configured to be accommodated in the frame. Thus, the holder and the power storage unit are protected by the frame of the bicycle.

In accordance with a tenth aspect of the present invention, the bicycle power supplying device according to the ninth aspect is configured so that the frame includes an opening and an opening-closing mechanism configured to open and close the opening, and the holder is attachable to the attachment portion that is arranged on a rear surface of the opening-closing mechanism. This hinders entrance of foreign objects and moisture into the frame. Also, the holder can be easily attached to the attachment portion.

In accordance with an eleventh aspect of the present invention, the bicycle power supplying device according to any one of the first to tenth aspects is configured so that the holder includes a housing configured to accommodate the dry cell. Thus, the dry cell is protected by the housing.

In accordance with a twelfth aspect of the present invention, the bicycle power supplying device according to the eleventh aspect is configured so that the housing is elastically deformable. This limits transmission of strong force to the dry cell.

In accordance with a thirteenth aspect of the present invention, the bicycle power supplying device according to the eleventh or twelfth aspect is configured so that the holder further includes a cover that closes an opening provided in the housing to accommodate the dry cell. This hinders entrance of foreign objects and moisture into the holder.

In accordance with a fourteenth aspect of the present invention, the bicycle power supplying device according to the thirteenth aspect is configured so that the holder further includes a first connection portion electrically connected to the first electrode and a second connection portion electrically connected to the second electrode, the first connection portion is arranged on one of the housing and the cover, and the second connection portion is arranged on the other one of the housing and the cover. Thus, the first electrode is electrically connected to the first connection portion in an appropriate manner, and the second electrode is electrically connected to the second connection portion in an appropriate manner.

In accordance with a fifteenth aspect of the present invention, the bicycle power supplying device according to any one of the eleventh to fourteenth aspects is configured so that the holder further includes a seal configured to limit entrance of at least one of a foreign object and moisture into the housing. This further hinders the entrance of foreign objects and moisture into the holder.

In accordance with a sixteenth aspect of the present invention, the bicycle power supplying device according to any one of the first to fifteenth aspects further includes a wireless communicator configured to transmit or receive a wireless signal. This dispenses with the electric wire related to the bicycle power supplying device and simplifies the structure of the bicycle power supplying device.

In accordance with a seventeenth aspect of the present invention, the bicycle power supplying device according to any one of the first to sixteenth aspects is configured so that the holder includes a first connection portion electrically connected to the first electrode and a second connection portion electrically connected to the second electrode, and one of the first connection portion and the second connection portion includes an elastic member configured to push the dry cell against the other one of the first connection portion and the second connection portion. Thus, the first electrode is electrically connected to the first connection portion in an appropriate manner, and the second electrode is electrically connected to the second connection portion in an appropriate manner.

In accordance with an eighteenth aspect of the present invention, the bicycle power supplying device according to the fourteenth or seventeenth aspect is configured so that one of the first electrode and the second electrode includes a projection, and the projection is connected to one of the first connection portion and the second connection portion. This brings one of the first electrode and the second electrode into strong contact with one of the first connection portion and the second connection portion.

In accordance with a nineteenth aspect of the present invention, the bicycle power supplying device according to any one of the first to eighteenth aspects further includes a notification unit that issues a notification of a state of charge of the dry cell. This allows the user to be easily notified of whether or not the power needed to drive the electric component is left.

In accordance with a twentieth aspect of the present invention, a bicycle electric device includes the bicycle power supplying device according to any one of the first to nineteenth aspects, and the electric component that includes an actuator. This allows for modularization of the bicycle power supplying device and the electric component.

Accordingly, the above bicycle power supplying device and bicycle electric device including the bicycle power supplying device easily obtain the power needed to drive the subject electric component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
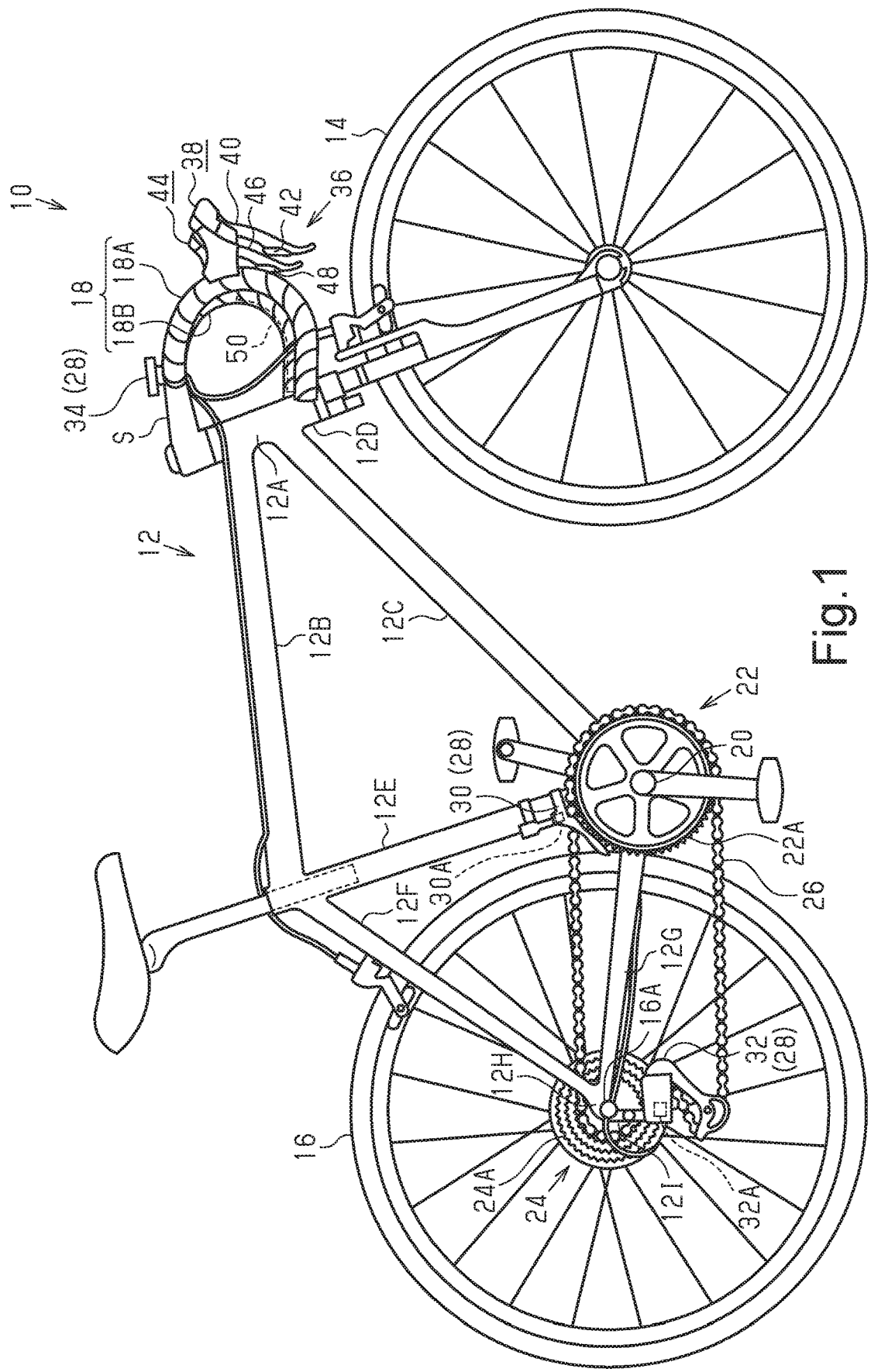
FIG. 1 is a side view of a bicycle including a power supplying device in accordance with a first embodiment.

FIG. 1 shows a bicycle 10 that includes a bicycle power supplying device 50 (hereafter referred to as "the power supplying device 50"). As shown in the drawings, one example of the type of the bicycle 10 is a road bike. In one example, the bicycle 10 further includes a frame set 12, a front wheel 14, a rear wheel 16 and a handlebar 18. The frame set 12 includes a head tube 12A, a top tube 12B, a down tube 12C, a front fork 12D, a seat tube 12E, a bottom bracket support portion (not shown), a seatstay 12F, a chainstay 12G, a rear end 12H and a derailleur hanger 12I. The handlebar 18 is coupled to the head tube 12A by a stem S. In one example, the handlebar 18 is shaped as a drop handlebar as shown in the drawings or a flat bar.

The bicycle 10 further includes a crank 20, a front sprocket assembly 22, a rear sprocket assembly 24, a chain 26, a plurality of electric components 28 and an operation device 36. The crank 20 is coupled to a bottom bracket that is supported by the bottom bracket support portion. The front sprocket assembly 22 includes one or more front sprockets 22A. The front sprocket assembly 22 is, for example, coupled to the crank 20 so as to rotate integrally with the crank 20. The rear sprocket assembly 24 includes one or more rear sprockets 24A. The rear sprocket assembly 24 is coupled to a hub assembly 16A of the rear wheel 16. The chain 26 runs around one of the front sprockets 22A of the front sprocket assembly 22 and one of the rear sprockets 24A of the rear sprocket assembly 24.

The electric components 28 include a front derailleur 30, a rear derailleur 32 and a display 34. The display 34 is arranged, for example, on the handlebar 18. In one example, the display 34 is a cycle computer. In the present embodiment, the front derailleur 30 is an electric gear shift device. The front derailleur 30 is coupled, for example, to the seat tube 12E. The front derailleur 30 includes an actuator 30A. The actuator 30A operates the front derailleur 30 to change the front sprocket 22A around which the chain 26 runs. In the present embodiment, the rear derailleur 32 is an electric gear shift device. The rear derailleur 32 is coupled, for example, to the derailleur hanger 12I. The rear derailleur 32 includes an actuator 32A. The actuator 32A operates the rear derailleur 32 to change the rear sprocket 24A around which the chain 26 runs.

The operation device 36 includes a first operation device 38 and a second operation device 44. The first operation device 38 is arranged, for example, on a right handlebar 18A. The first operation device 38 includes a first brake lever 40 and a first shift operation portion 42. The first brake lever 40 is configured to apply the brakes on the rear wheel 16. The first shift operation portion 42 is arranged, for example, on the first brake lever 40. The first shift operation portion 42 is communicably connected to the rear derailleur 32. The connection mode is wireless communication or wired communication. The first shift operation portion 42 is operated to drive the rear derailleur 32.

The second operation device 44 is arranged, for example, on a left handlebar 18B. The second operation device 44 includes a second brake lever 46 and a second shift operation portion 48. The second brake lever 46 is configured to apply the brakes on the front wheel 14. The second shift operation portion 48 is arranged on the second brake lever 46. The second shift operation portion 48 is communicably connected to the front derailleur 30. The connection mode is wireless communication or wired communication. The second shift operation portion 48 is operated to drive the front derailleur 30.

The power supplying device 50 supplies power to the electric component 28 that is subject to the supply of power. The subject electric component 28 includes, for example, the front derailleur 30, the rear derailleur 32 and the display 34. The power supplying device 50 is accommodated, for example, in the left handlebar 18B.

Figure 2:
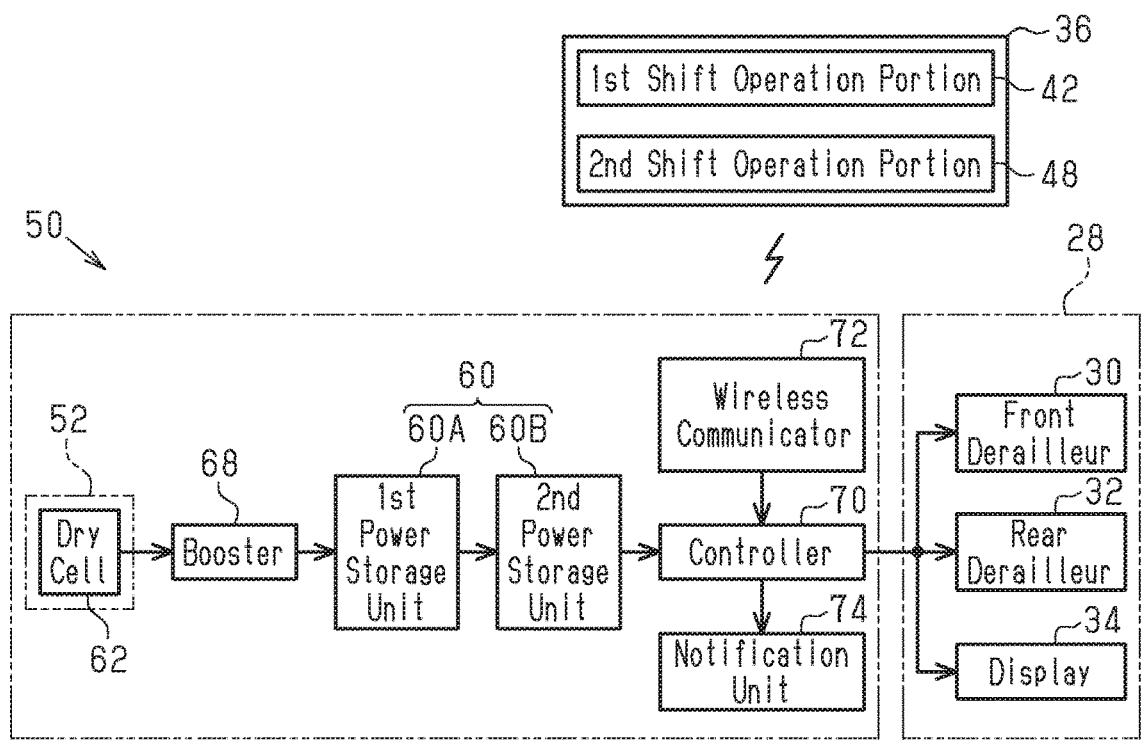
FIG. 2 is a block diagram showing the configuration of the power supplying device shown in FIG. 1.

As shown in FIG. 2, the power supplying device 50 includes a holder 52 and a power storage unit 60. The holder 52 holds a dry cell 62 so that the dry cell 62 is attachable to and removable from the holder 52. The power storage unit 60 stores power of the dry cell 62 and supplies the stored power to the subject electric component 28. The power storage unit 60 includes a first power storage unit 60A and a second power storage unit 60B. The power storage units 60A and 60B are connected in series. In one example, each of the power storage units 60A and 60B includes a lithium-ion capacitor.

The power supplying device 50 further includes a voltage booster 68. The voltage booster 68 increases the voltage of the dry cell 62 that is held by the holder 52. The voltage booster 68 is configured, for example, to increase the voltage of the dry cell 62 by generally 4.5 times. The voltage booster 68 is arranged between the holder 52 and the power storage unit 60 to be electrically connected to the holder 52 and the power storage unit 60.

The power supplying device 50 further includes an electronic controller 70, a wireless communicator 72 and a notification unit 74. The wireless communicator 72 is configured to transmit or receive a wireless signal. The term "wireless communicator" as used herein includes a receiver, a transmitter, a transceiver, a transmitter-receiver, and contemplates any device or devices, separate or combined, capable of transmitting and/or receiving wireless communication signals. The wireless communication signals can be radio frequency (RF) signals, ultra-wide band communication signals, or Bluetooth communications or any other type of signal suitable for wireless communications as understood in the bicycle field. The notification unit 74 issues a notification of the state of charge of the dry cell 62 that is held by the holder 52. The notification unit 74 is arranged, for example, on the holder 52. The wireless communicator 72, for example, receives wireless signals from the shift operation portions 42 and 48 and transmits the received signals to the controller 70. The wireless signals include a signal related to shift-up and a signal related to shift-down.

The electronic controller 70 includes, for example, a microprocessor. The electronic controller 70 (hereinafter "the controller 70") includes one or more processors units and one or more computer memory devices. The controller 26 can also include general circuits such as an input interface circuit and an output interface circuit. The controller 70 is communicably connected to the electric components 28. In a first example, the controller 70 is connected to the electric components 28 by electric wires (not shown) so as to perform power line communication (PLC). In a second example, the controller 70 is communicably connected to the electric components 28 so as to perform wireless communication. The controller 70 controls the electric components 28. In one example, the controller 70 controls each of the derailleurs 30 and 32 in accordance with signals received from the wireless communicator 72. The controller 70 is also configured to control, for example, the boosting operation of the voltage booster 68.

Figure 3:
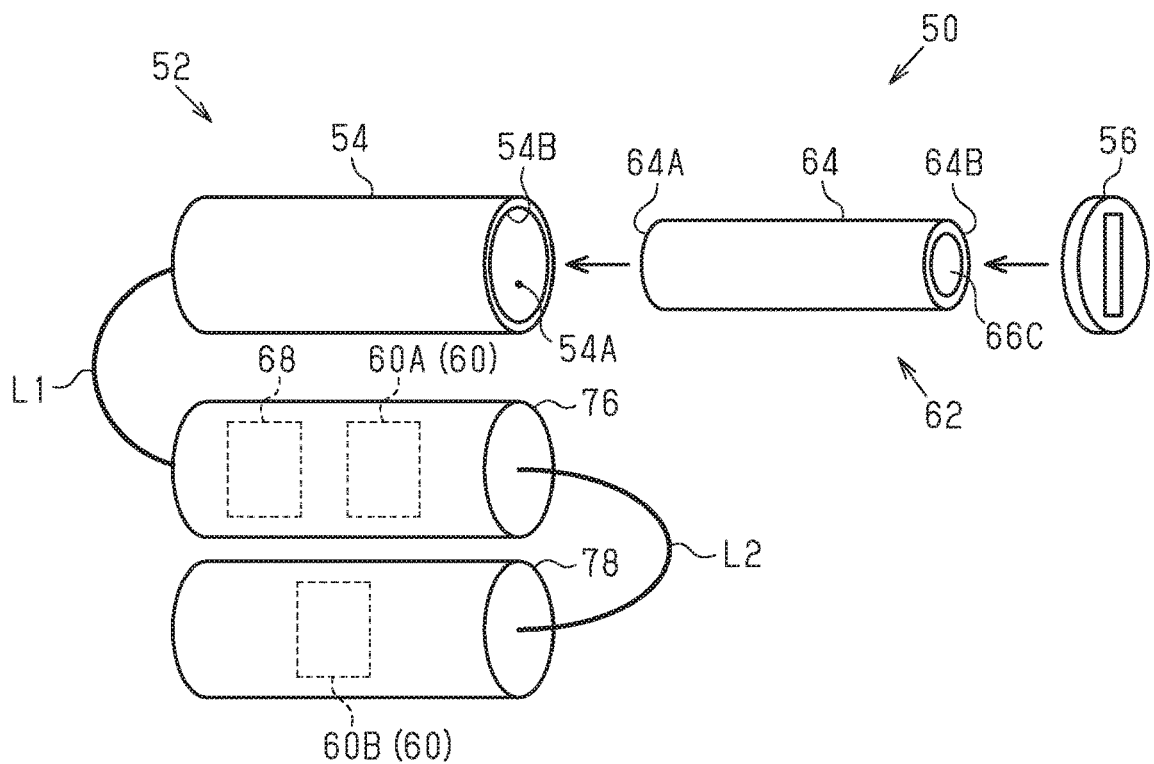
FIG. 3 is a schematic diagram of the power supplying device shown in FIG. 1.

As shown in FIG. 3, the power supplying device 50 further includes a first housing 54, a second housing 76, a third housing 78, a first electric wire L1 and a second electric wire L2. The second housing 76 and the third housing 78 are elastically deformable. Each of the second housing 76 and the third housing 78 is formed from a material having a high elastic limit. One example of the material is synthetic rubber. The second housing 76 accommodates at least the first power storage unit 60A and the voltage booster 68. The third housing 78 accommodates at least the second power storage unit 60B.

The holder 52 includes the first housing 54 and a cover 56. The first housing 54 includes an accommodation space 54A configured to accommodate the dry cell 62. The first housing 54 is elastically deformable. The first housing 54 is formed from a material having a high elastic limit. One example of the material is synthetic rubber. The cover 56 is configured to close an opening 54B that is provided in the first housing 54 to accommodate the dry cell 62. The opening 54B is communicated to the accommodation space 54A. The dry cell 62 is inserted into the accommodation space 54A through the opening 54B. In a state in which the cover 56 is coupled to the first housing 54 to close the opening 54B, the dry cell 62 is held by the holder 52.

The dry cell 62 is, for example, a primary cell or a rechargeable cell. The dry cell 62 includes a body 64, a first electrode 66A (refer to FIG. 4) and a second electrode 66C. The body 64 is tubular. In the present embodiment, the dry cell 62 is a double-A cell. The first electrode 66A is arranged on one end 64A of the body 64 (refer to FIG. 4). The second electrode 66C is arranged on the other end 64B of the body 64. The first electrode 66A includes, for example, a projection 66B (refer to FIG. 4). The first electric wire L1 connects, for example, the voltage booster 68 and a first connection portion 54C (refer to FIG. 4) that is connected to the first electrode 66A. The second electric wire L2 connects, for example, the first power storage unit 60A and the second power storage unit 60B.

Figure 4:
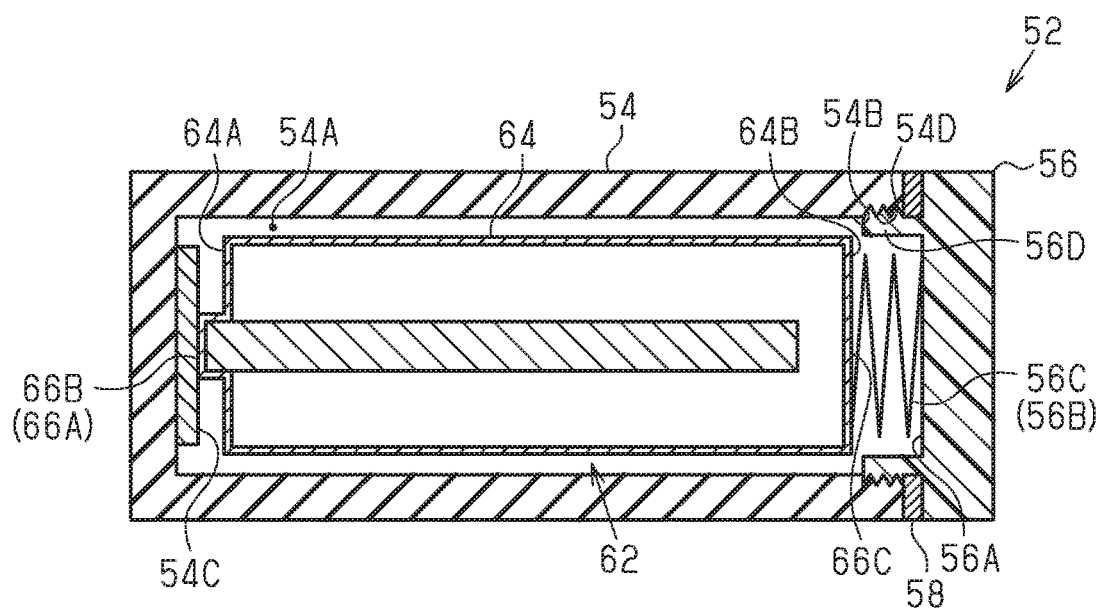
FIG. 4 is a cross-sectional view of a holder that accommodates the dry cell shown in FIG. 3.

As shown in FIG. 4, the holder 52 further includes the first connection portion 54C and a second connection portion 56B. The first connection portion 54C is arranged in the first housing 54, and electrically connected to the first electrode 66A. In one example, the first connection portion 54C is arranged on one end of the first housing 54 in the first housing 54. The projection 66B of the first electrode 66A is connected to the first connection portion 54C. The second connection portion 56B is arranged on a rear surface 56A of the cover 56, and electrically connected to the second electrode 66C. The second connection portion 56B includes an elastic member 56C. The elastic member 56C is configured to push the dry cell 62, which is accommodated in the accommodation space 54A, against the first connection portion 54C. In a case in which the cover 56 closes the opening 54B, the dry cell 62 is held by the holder 52 with the first electrode 66A and the first connection portion 54C in contact with each other and the second electrode 66C and the second connection portion 56B in contact with each other.

The holder 52 further includes an attachment-removal structure. The attachment-removal structure couples the cover 56 to the first housing 54 so that the cover 56 is attachable to and removable from the first housing 54. The attachment-removal structure includes a first internal threaded portion 54D and a first external threaded portion 56D. The first internal threaded portion 54D is arranged on an inner circumference of the first housing 54 at the side of the opening 54B. The first external threaded portion 56D projects from the rear surface 56A of the cover 56. In a state in which the first internal threaded portion 54D is coupled to the first external threaded portion 56D, the cover 56 closes the opening 54B.

The holder 52 further includes a seal 58. The seal 58 is configured to limit the entrance of foreign objects and moisture into the first housing 54. The seal 58 is arranged, for example, on the rear surface 56A of the cover 56 along the edge of the first housing 54 defining the opening 54B. In a case in which the cover 56 closes the opening 54B, the seal 58 prevents foreign objects and moisture from entering the accommodation space 54A.

Figure 5:
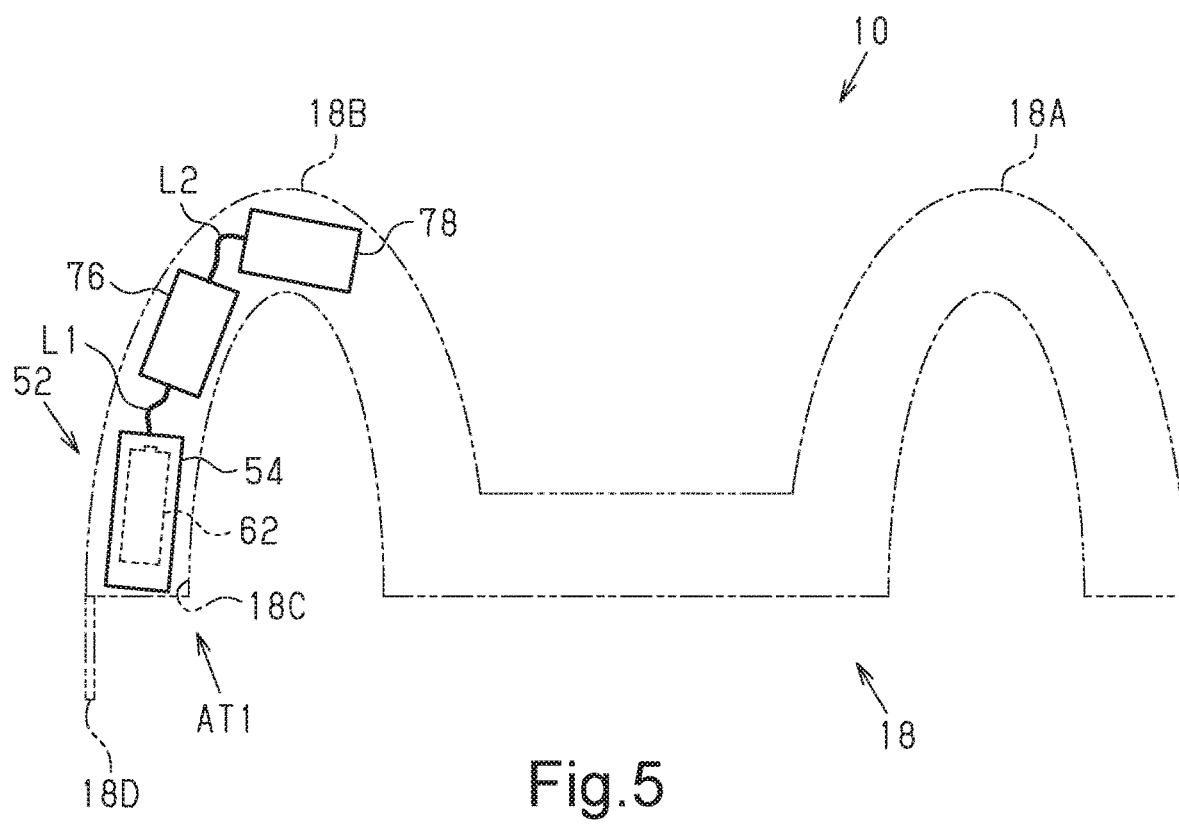
FIG. 5 is a schematic diagram showing a first attachment mode of the power supplying device shown in FIG. 1.

FIG. 5 shows one example of a first attachment mode of the power supplying device 50 to the bicycle 10. The power supplying device 50, which includes the holder 52 and the power storage unit 60, is configured to be accommodated in the handlebar 18. In the illustrated example, the power supplying device 50 is accommodated in the left handlebar 18B. In another example, the power supplying device 50 is accommodated in the right handlebar 18A. The holder 52 is attachable to an attachment portion AT1 of the bicycle 10 including the electric components 28 (refer to FIG. 1). The attachment portion AT1 is arranged in the handlebar 18 of the bicycle 10. In the illustrated example, the attachment portion AT1 is arranged in the left handlebar 18B. In another example, the attachment portion AT1 is arranged in the right handlebar 18A.

The left handlebar 18B includes an opening 18C and a cover 18D. The left handlebar 18B is hollow. The opening 18C is provided in the end of the left handlebar 18B. The cover 18D is arranged on the end of the left handlebar 18B and configured to open and close the opening 18C. Each of the housings 54, 76 and 78 is arranged in the handlebar 18. Since each of the housings 54, 76 and 78 is elastically deformable, the housings 54, 76 and 78 can be easily inserted into the handlebar 18. In one example, the housings 54, 76 and 78 are arranged in the left handlebar 18B in the order of the first housing 54, the second housing 76, and the third housing 78 from the side of the opening 18C. The end of the first housing 54 including the opening 54B (refer to FIG. 3) is arranged at the side of the opening 18C. This facilitates the insertion of the dry cell 62 into the first housing 54 and the removal of the dry cell 62 from the first housing 54.

The power supplying device 50 shown in FIG. 2 operates, for example, as follows. The voltage booster 68 increases the voltage of the dry cell 62, which is held by the holder 52, and supplies the voltage to the power storage unit 60. The power storage unit 60 stores power that is needed to drive the subject electric component 28. In a case in which the shift operation portions 42 and 48 are operated, the power storage unit 60 supplies power to the corresponding one of the derailleurs 30 and 32. The derailleurs 30 and 32 are driven by the supplied power. In a case in which the display 34 is set to be powered on, the power storage unit 60 supplies power to the display 34. The display 34 is driven by the supplied power. This allows the power supplying device 50 to obtain the power needed to drive the electric components 28 with the single dry cell 62. Thus, the power needed to drive the subject electric component 28 is easily obtained.

Second Embodiment

A second embodiment of a power supplying device 50 differs from the first embodiment of the power supplying device 50 in the following points but otherwise has substantially the same structure as the first embodiment of the power supplying device 50.

Figure 6:
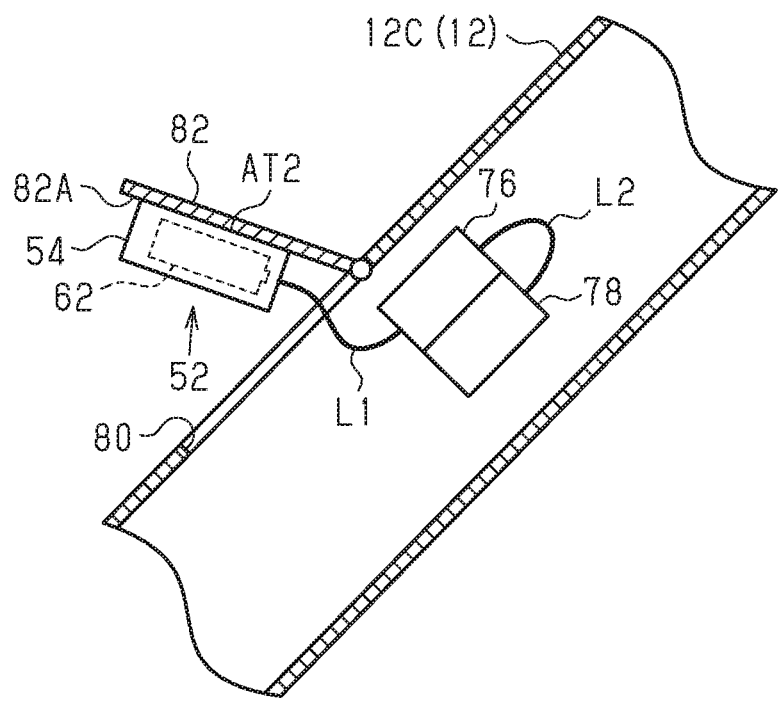
FIG. 6 is a schematic diagram showing a second attachment mode of a second embodiment of a power supplying device.

FIG. 6 shows one example of a second attachment mode of the power supplying device 50 to the bicycle 10. The holder 52 is attachable to an attachment portion AT2 of the bicycle 10 including the electric components 28 (refer to FIG. 1). The attachment portion AT2 is arranged in the frame set 12 of the bicycle 10. In one example, the attachment portion AT2 is arranged in one of the head tube 12A, the top tube 12B, the down tube 12C, the front fork 12D, the seat tube 12E, the seatstay 12F, and the chainstay 12G. In the illustrated example, the attachment portion AT2 is arranged in the down tube 12C.

The down tube 12C includes an opening 80 and an opening-closing mechanism 82. The opening 80 is provided, for example, in an upper surface of the down tube 12C. The opening 80 is communicated to the interior of the down tube 12C. The opening-closing mechanism 82 includes, for example, a hinge mechanism. The opening-closing mechanism 82 is arranged on the down tube 12C and configured to open and close the opening 80. The attachment portion AT2 is arranged, for example, on a rear surface 82A of the opening-closing mechanism 82. The power supplying device 50, which includes the holder 52 and the power storage unit 60, is accommodated in the down tube 12C. In one example, the second housing 76 and the third housing 78 are inserted into the down tube 12C. The first housing 54 is attached to the rear surface 82A of the opening-closing mechanism 82.

MODIFIED EXAMPLES

The above description illustrates embodiments of a bicycle power supplying device and a bicycle electric device including the bicycle power supplying device according to the present invention and is not intended to be restrictive. In addition to the embodiments, the present invention can include, for example, modified examples described below. Further, two or more of the modified examples can be combined.

The attachment portions AT1 and AT2 can have any structure. In a first example, the attachment portion AT1 is arranged so that the holder 52 is attachable to the end of the left handlebar 18B in the left handlebar 18B. In a second example, the left handlebar 18B of the first example does not include the cover 18D. In a third embodiment, the attachment portion AT2 is arranged in the frame set 12 at a location other than the rear surface 82A of the opening-closing mechanism 82. In a fourth example, the power supplying device 50 is attachable to an attachment portion arranged on the exterior of the frame set 12.

The power supplying device 50 can have any structure. In a first example, the power supplying device 50 does not include the voltage booster 68. In a second example, the holder 52 of the first example has a structure configured to hold a plurality of dry cells 62 in series. In a third example, the power supplying device 50 does not include the controller 70. In a fourth example, the controller 70 of the third example is arranged, for example, in one of the electric components 28. In a fifth example, the power supplying device 50 does not include the wireless communicator 72. In a sixth example, the shift operation portions 42 and 48 of the fifth example are electrically connected to the derailleurs 30 and 32 by wires, for example, so as to perform power line communication. In a seventh example, the power supplying device 50 does not include the notification unit 74.

The holder 52 can have any structure. In a first example, the holder 52 does not include the first housing 54. In a second example, the holder 52 does not include the cover 56. In a third example, the holder 52 does not include the seal 58. In a fourth example, the holder 52 has a structure that holds a plurality of dry cells 62 connected in series or parallel. In a fifth example, the first connection portion 54C is arranged on the rear surface 56A of the cover 56, and the second connection portion 56B is arranged on the first housing 54. In a sixth example, the second connection portion 56B does not include the elastic member 56C.

The material forming the first housing 54 can be changed to any suitable material. In one example, the first housing 54 is formed from a material having a low elastic limit. The second housing 76 and the third housing 78 can be changed in the same manner.

The attachment-removal structure can be changed to any structure. In a first example, the attachment-removal structure includes a second external threaded portion and a second internal threaded portion. The second external threaded portion is arranged on an outer circumference of the first housing 54 at the side of the opening 54B. The second internal threaded portion projects from the rear surface 56A of the cover 56. In a second example, the attachment-removal structure includes a projection and a recess. The projection is arranged on one of the first housing 54 and the cover 56. The recess is arranged in the other one of the first housing 54 and the cover 56. The fitting of the projection to the recess couples the cover 56 to the first housing 54 so that the cover 56 is attachable to and removable from the first housing 54. In a third example, the attachment-removal structure includes threads that allow the cover 56 to be coupled to the first housing 54.

The power storage unit 60 can have any structure. In a first example, the power storage unit 60 does not include one of the first power storage unit 60A and the second power storage unit 60B. In a second example, the power storage unit 60 further includes at least one power storage unit in addition to the first power storage unit 60A and the second power storage unit 60B. In a third example, at least one of the first power storage unit 60A and the second power storage unit 60B includes a redox capacitor or a hybrid capacitor instead of a lithium-ion capacitor. In a fourth example, the power storage units 60A, 60B are connected in parallel.

The dry cell 62 can have any structure. In a first example, the body 64 is of a button type. In a second example, the body 64 has the form of a tetragonal rod. In a third example, the first electrode 66A is arranged on the other end 64B of the body 64, and the second electrode 66C is arranged on the one end 64A of the body 64. In a fourth example, the dry cell 62 is, for example, a D cell, a C cell, a triple-A cell, an N cell or a quadruple-A cell.

Figure 7:
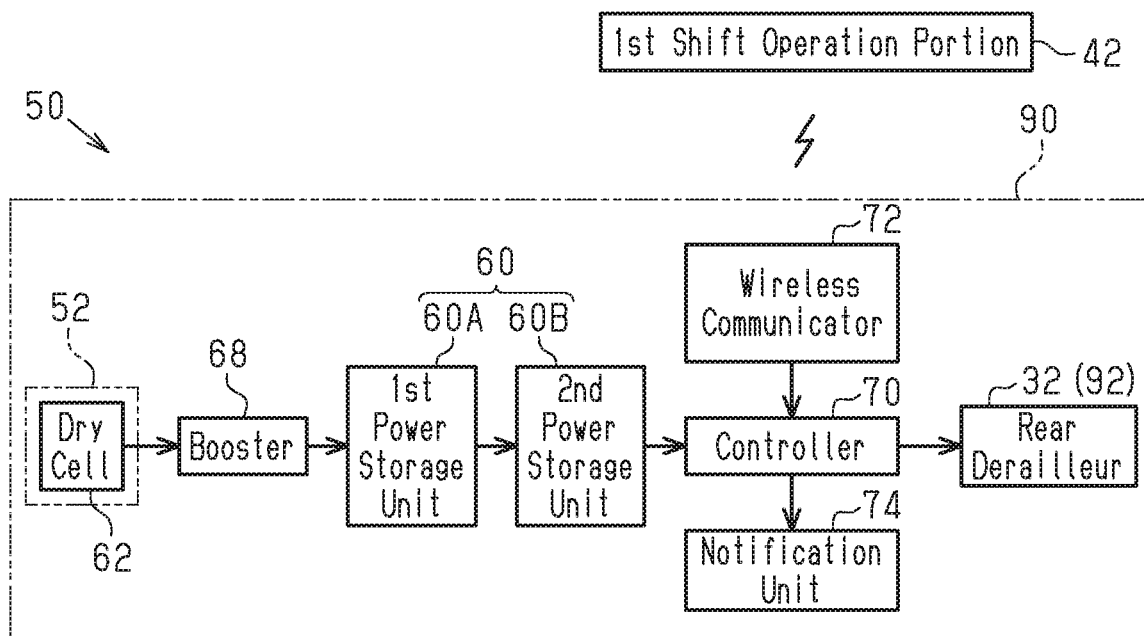
FIG. 7 is a block diagram showing the configuration of a modified example of a bicycle electric device.

The bicycle 10 can have any structure. As shown in FIG. 7, the bicycle 10 includes a bicycle electric device 90. The bicycle electric device 90 includes an electric component 92 and the power supplying device 50. The electric component 92 includes at least an actuator. In one example, the electric component 92 includes one of the rear derailleur 32 and the front derailleur 30. In the illustrated example, the electric component 92 includes the rear derailleur 32. The power supplying device 50 is arranged, for example, integrally with the electric component 92. In a case in which the first shift operation portion 42 is operated, the bicycle electric device 90 supplies power stored in the power storage unit 60 to the rear derailleur 32. The subject electric component 28, which receives power from the power supplying device 50, can include at least one of the front derailleur 30 and the display 34 in addition to the rear derailleur 32.

Figure 8:
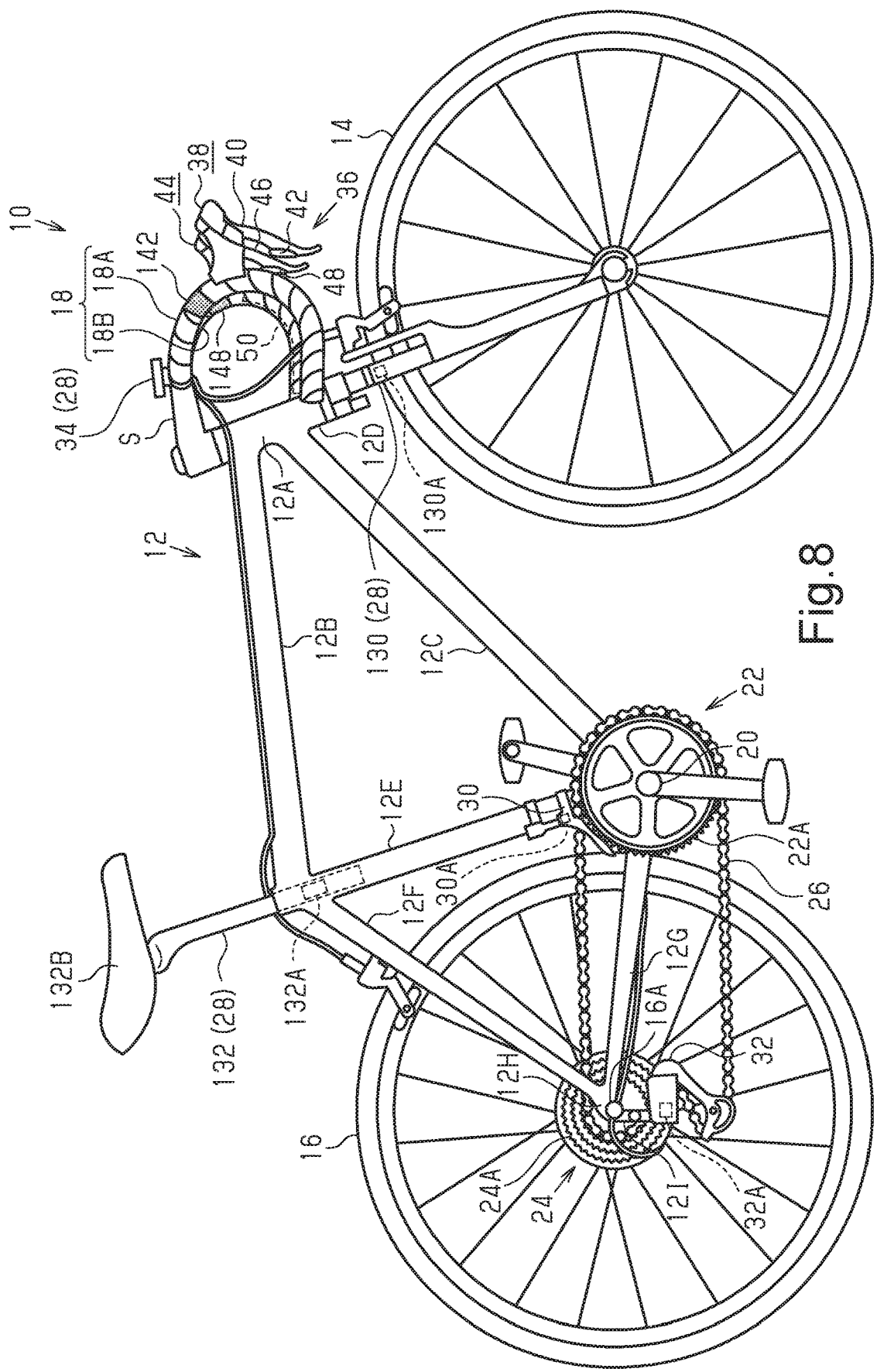
FIG. 8 is a side view of a bicycle including a modified example of a power supplying device.
Figure 9:
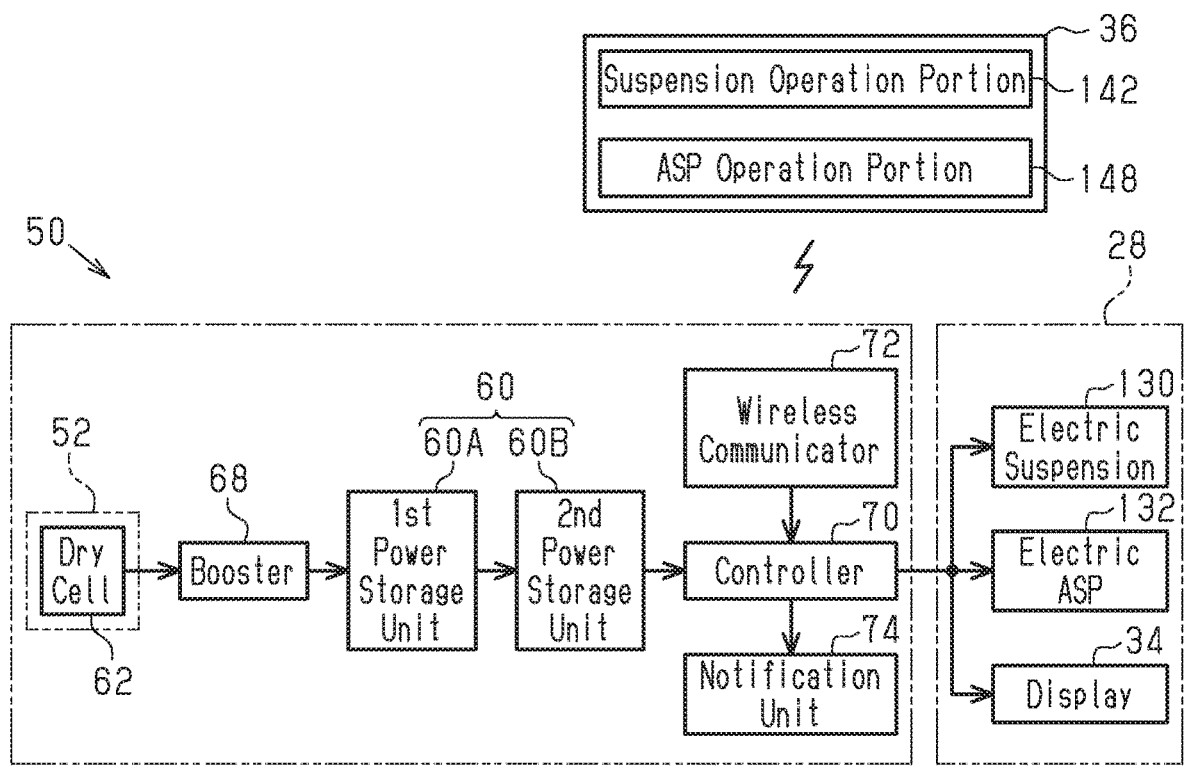
FIG. 9 is a block diagram showing the configuration of the power supplying device shown in FIG. 8.

The electric components 28 can have any configuration. In a first example, the electric components 28 include one or two of the front derailleur 30, the rear derailleur 32, and the display 34. In a second example, instead of or in addition to at least one of the front derailleur 30, the rear derailleur 32, and the display 34, the electric components 28 further include at least one of an electric suspension 130 and an electric adjustable seatpost 132 (hereafter referred to as "the electric ASP 132"). As shown in FIGS. 8 and 9, the electric components 28 include the display 34, the electric suspension 130, and the electric ASP 132. The electric suspension 130 includes an actuator 130A. The actuator 130A operates the electric suspension 130 to absorb shocks applied to the front wheel 14. The electric ASP 132 includes an actuator 132A. The actuator 132A operates the electric ASP 132 to change the height of a saddle 132B relative to the frame set 12. The operation state of each of the electric suspension 130 and the electric ASP 132 is changed by a suspension operation portion 142 and an ASP operation portion 148 that are included in the operation device 36. In one example, the suspension operation portion 142 is arranged on one of the right handlebar 18A and the left handlebar 18B. The ASP operation portion 148 is arranged on the other one of the right handlebar 18A and the left handlebar 18B. In a third example, instead of or in addition to at least one of the front derailleur 30, the rear derailleur 32, the display 34, the electric suspension 130, and the electric ASP 132, the electric components 28 further include an electric assist unit. The electric assist unit includes an actuator. The actuator operates the electric assist unit to assist propulsion of the bicycle 10. In the second example and the third example, the electric component 92 shown in FIG. 7 can include at least one of the electric suspension 130, the electric ASP 132, and the electric assist unit.

What is claimed is:

1. A bicycle power supplying device comprising:
    a holder configured to attachably and detachably hold a dry cell that includes a body, a first electrode arranged on the body, and a second electrode arranged on the body;
    a power storage unit configured to store power of the dry cell and supply the stored power to a subject bicycle electric component of a bicycle, the holder having a first housing that encloses the dry cell and a second housing that encloses the power storage unit; and a booster configured to increase voltage of the dry cell, the booster being enclosed in the second housing and is electrically connected to one of the first electrode and the second electrode by an electric wire that extends outside of the first and second housings to connect the second housing to one of the first electrode and the second electrode.

2. The bicycle power supplying device according to claim 1, wherein the booster is arranged between the holder and the power storage unit to be electrically connected to the holder and the power storage unit.

3. The bicycle power supplying device according to claim 1, wherein the body is tubular.

4. The bicycle power supplying device according to claim 1, wherein the first electrode is arranged on one end of the body, and the second electrode is arranged on the other end of the body.

5. The bicycle power supplying device according to claim 1, further comprising:
an electronic controller that controls the electric component.

6. The bicycle power supplying device according to claim 1, wherein
the holder is attachable to an attachment portion of the bicycle that includes the electric component.

7. The bicycle power supplying device according to claim 6, wherein
the attachment portion is arranged in a handlebar of the bicycle, and
the holder and the power storage unit are configured to be accommodated in the handlebar.

8. The bicycle power supplying device according to claim 6, wherein
the attachment portion is arranged in a frame of the bicycle, and
the holder and the power storage unit are configured to be accommodated in the frame.

9. The bicycle power supplying device according to claim 8, wherein
the frame includes an opening and an opening-closing mechanism configured to open and close the opening, and
the holder is attachable to the attachment portion that is arranged on a rear surface of the opening-closing mechanism.

10. The bicycle power supplying device according to claim 1, wherein
the first housing is elastically deformable.

11. The bicycle power supplying device according to claim 1, wherein
the holder further includes a cover that closes an opening provided in the first housing to enclose the dry cell.

12. The bicycle power supplying device according to claim 11, wherein
the holder further includes a first connection portion electrically connected to the first electrode and a second connection portion electrically connected to the second electrode,
the first connection portion is arranged on one of the first housing and the cover, and
the second connection portion is arranged on the other one of the first housing and the cover.

13. The bicycle power supplying device according to claim 12, wherein
one of the first electrode and the second electrode includes a projection, and
the projection is connected to one of the first connection portion and the second connection portion.

14. The bicycle power supplying device according to claim 1, wherein
the holder further includes a seal configured to limit entrance of at least one of a foreign object and moisture into the first housing.

15. The bicycle power supplying device according to claim 1, further comprising:
a wireless communicator configured to transmit or receive a wireless signal.

16. The bicycle power supplying device according to claim 1, wherein
the holder includes a first connection portion electrically connected to the first electrode and a second connection portion electrically connected to the second electrode, and
one of the first connection portion and the second connection portion includes an elastic member configured to push the dry cell against the other one of the first connection portion and the second connection portion.

17. The bicycle power supplying device according to claim 1, further comprising:
a notification unit that issues a notification of a state of charge of the dry cell.

18. A bicycle electric device comprising:
the bicycle power supplying device according to claim 1; and
the electric component that includes an actuator.

19. The bicycle electric device according to claim 18, wherein
the electric component includes at least one of a front derailleur, a rear derailleur, an electric suspension and an electric adjustable seatpost for the bicycle.

20. The bicycle electric device according to claim 1, further comprising
another power storage unit that is accommodated in a third housing of the holder, the another power storage being electrically connected to the power storage unit.

* * * * *